J. E. LANDERS.
Flower-Pots.
No. 153,715. Patented Aug. 4, 1874.
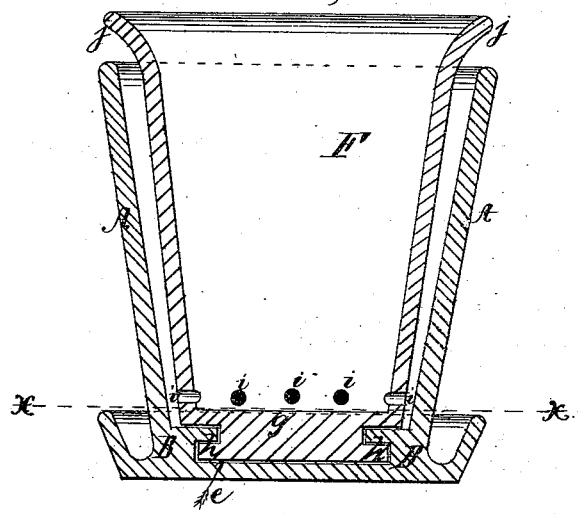
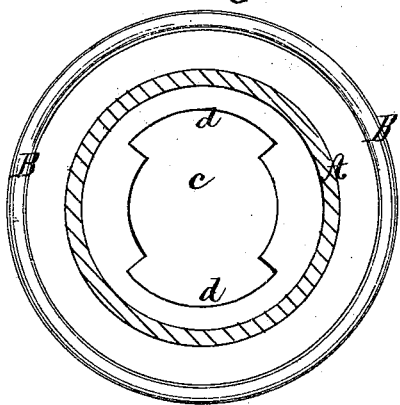
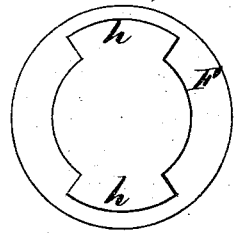
Witnesses:
Franklin Barrett
Richard Gerner
Inventor:
Joseph Edward Landers
Per,
Henry Gerner,
Atty.

UNITED STATES PATENT OFFICE.

JOSEPH E. LANDERS, OF NEW BEDFORD, MASSACHUSETTS.

IMPROVEMENT IN FLOWER-POTS.

Specification forming part of Letters Patent No. 153,715, dated August 4, 1874; application filed June 25, 1874.

*To all whom it may concern:*

Be it known that I, JOSEPH EDWARD LANDERS, of New Bedford, Bristol county, State of Massachusetts, have invented certain Improvements in Flower-Pots, of which the following is a specification:

The object of my invention is to provide that the inner pots, in the class of flower-pots with an annular space between the inner and the outer pot, may be manufactured separate, and at will may be interlocked with, or separated from, the outer; also, that the inner pot may be made higher than the outer, and curved at the top, extending outward over the rim of the outer pot, in order to prevent leaves, earth, and other matters from filling up the annular space between the two pots.

My invention consists in constructing the inner pot with a circular projection underneath the bottom, provided with two or more flanges extending outward from the lower part of the same, and fitting into a circular hole in the bottom of the outer pot, with corresponding openings in the sides for the reception of the flanges. The saucer or stand attached to the rim of the outer pot, thus forms a recess or inclosed space for the projection and the flanges in the bottom of the inner pot. The inner pot is made somewhat higher than the outer, and is curved at the top, said curve extending outward and projecting over the rim of the outer pot, when the pots are interlocked in each other.

In order to more fully describe my invention, I refer to the accompanying drawing forming a part of this specification.

Figure I is an elevated sectional view of a double flower-pot, embodying my invention. Fig. II is a sectional plan view of the outer pot, taken on line $x\ x$, Fig. I. Fig. III is an inverted view of the inner pot.

A is the outer pot; B the saucer or stand. $c$ is the circular hole in the bottom of pot A. $d\ d$ are the openings on the side of the circular hole. $e$ is the recess formed between the top of the saucer and the bottom of the pot A. F is the inner pot, with projection $g$ with flanges $h\ h$, corresponding with the openings $d\ d$. $i\ i$ are holes at or near the bottom in the sides of the inner pot F. $j$ is the curved top of pot F, extending outward over the top of the outer pot A.

Having thus described my invention, I desire to claim—

The pot F, with a curved top, $j$, and projections $g$ and flanges $h\ h$, in combination with pot A, with circular hole $c$ and openings $d\ d$, substantially as and for the purpose hereinbefore set forth.

This specification signed this 12th day of June, 1874.

JOSEPH EDWARD LANDERS.

Witnesses:
ANTON C. CRONDAL,
FRANKLIN BARRITT.